J. GIBBS.
Improvement in Potato-Droppers.

No. 128,384.　　　　　　　　　　Patented June 25, 1872.

Witnesses:
Jennie M. Grant
Andrew Chaffin

Joshua Gibbs, Inventor
by Job Abbot, Attorney

128,384

UNITED STATES PATENT OFFICE.

JOSHUA GIBBS, OF CANTON, OHIO.

IMPROVEMENT IN POTATO-DROPPERS.

Specification forming part of Letters Patent No. 128,384, dated June 25, 1872.

SPECIFICATION.

*To whom it may concern:*

Be it known that I, JOSHUA GIBBS, of Canton, in the county of Stark and State of Ohio, have invented certain new and useful Improvements in Potato-Droppers; and that the following is a full, clear, and exact specification thereof, which will enable others skilled in the art to make and use the said invention.

It is well known to persons having any experience in the planting of heavy seed—such, for example, as potatoes, by hand dropping—that the work is very fatiguing, as the amount of seed required to cross and return over the field has considerable weight, and the constant stooping over required to place the seed in proper position in the hills, when loaded down with the weight of the seed, makes the work very hard on the operator.

My invention is designed to overcome this difficulty; and it consists in the construction of a long conveying-tube having a handle at its upper end, and a gauge-rod at its lower end for determining the spaces between the hills, which tube is grasped by the operator with his right hand and carried after the manner of a walking-staff, leaving the left hand free to take the seed from a basket suspended by a strap over the operator's shoulder, and drop it into the conveying-tube, by which it is conducted to the precise position required on the ground, thus saving the operator the fatigue due to the stooping over required by the ordinary mode of dropping, and greatly facilitating the operation of dropping.

Figure 1:
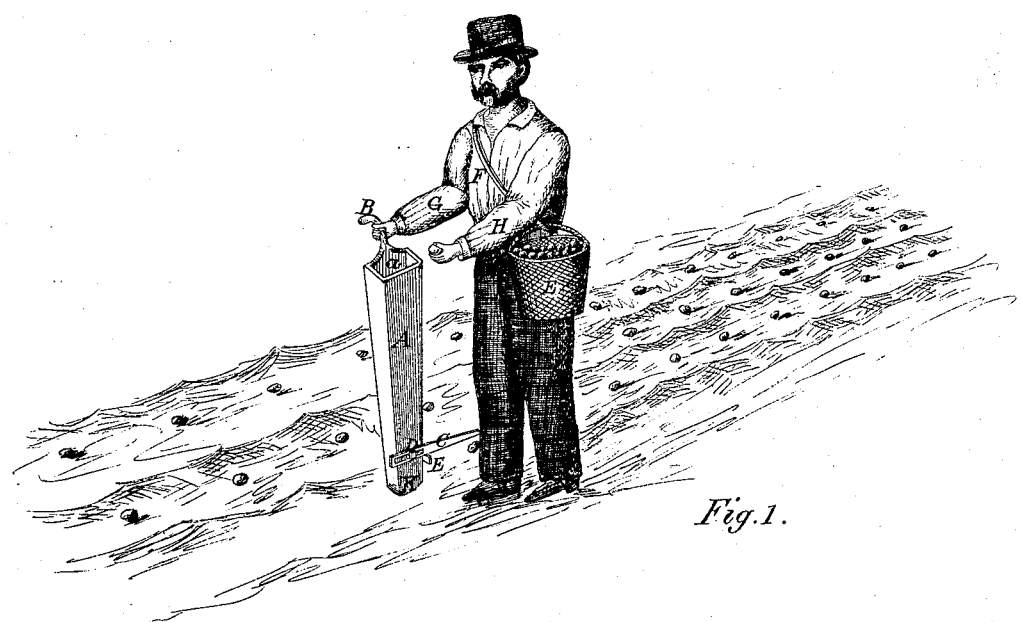
Figure 2:
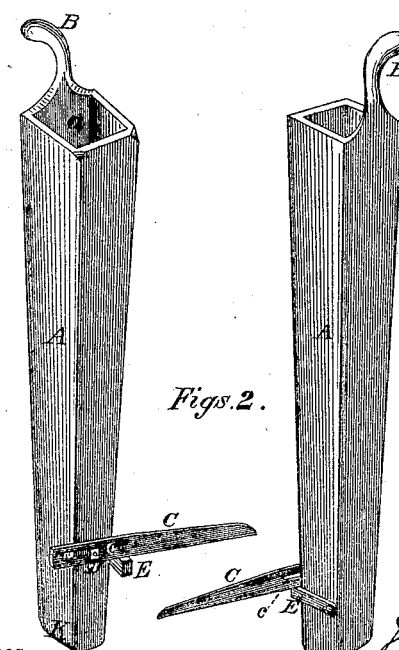

In the accompanying drawing, Figure 1 is a perspective view, showing the practical operation of my improved dropper. Figs. 2 are perspective views of the dropper.

The conveying-tube A is conveniently made of light wood, and has the handle B formed at its upper end, the tube being usually made to taper down toward the lower end, and the hole *a* through it being of suitable size to allow of the passage of the seed to be dropped. At the lower end of this tube is secured a gauge-rod, C, which is usually made adjustable, in order to vary the spaces between the hills when required. The slot *c* is formed in this rod, and through it passes the screw or bolt D, by which it is secured to the tube A, the rear end of the rod being held up by the stop E secured on the tube A.

The manner of operating with this dropper is as follows: The operator passes a strap, F, around his neck and over the right shoulder, and to it secures the basket E containing the seed, thus supporting the basket under his left arm H, as shown in Fig. 1. Then grasping the handle B of the dropper A with his right hand, G, he places the bottom K of the dropper on the place where he wishes the seed to fall, and reaching into the basket E with his left hand, takes out the proper amount of seed and drops it into the hole *a* in the tube A, through which it falls into the precise place desired. Then stepping forward he raises the dropper A and swings it forward until the end of the gauge-rod C is over the hill of seed just dropped, when he brings the end K down to the ground, and drops the seed as before, the rod C thus serving to regulate the spaces between the hills.

It is obvious that any seeds, such as are usually dropped two or three or more in a hill by hand—such, for instance, as corn or beans—can be as readily dropped with this dropper as potatoes, and it is also evident that tin or other light metal tubes could be used in place of the wooden tube described; the gist of the invention consisting in the use of the conveying-tube provided with the handle at the top, and the gauge-rod at the lower end.

What I claim as my invention, and desire to secure by Letters Patent, is—

A hand potato or seed dropper, consisting of a conveying-tube provided with a handle at its upper end, and having a gauge-rod arranged at its lower end, the general arrangement of the parts and the manner of operating the dropper being substantially as is herein specified.

As evidence of the foregoing witness my hand this 11th day of May, A. D. 1872.

JOSHUA GIBBS.

Witnesses:
 JOB ABBOTT,
 ANDREW CHOFFIN.